US012294144B2

(12) United States Patent
Hara

(10) Patent No.: US 12,294,144 B2
(45) Date of Patent: May 6, 2025

(54) ANTENNA DEVICE FOR VEHICLE

(71) Applicant: YOKOWO CO., LTD., Tokyo (JP)

(72) Inventor: Bunpei Hara, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 114 days.

(21) Appl. No.: 18/013,269

(22) PCT Filed: Jul. 26, 2021

(86) PCT No.: PCT/JP2021/027479
§ 371 (c)(1),
(2) Date: Dec. 28, 2022

(87) PCT Pub. No.: WO2022/024966
PCT Pub. Date: Feb. 3, 2022

(65) Prior Publication Data

US 2023/0253712 A1 Aug. 10, 2023

(30) Foreign Application Priority Data

Jul. 27, 2020 (JP) ................................. 2020-126223

(51) Int. Cl.

| | |
|---|---|
| ***H01Q 1/32*** | (2006.01) |
| ***H01Q 1/42*** | (2006.01) |
| ***H01Q 9/32*** | (2006.01) |
| ***H01Q 21/28*** | (2006.01) |
| *H01Q 1/24* | (2006.01) |

(52) U.S. Cl.
CPC ......... *H01Q 1/3275* (2013.01); *H01Q 1/3216* (2013.01); *H01Q 1/42* (2013.01); *H01Q 9/32* (2013.01); *H01Q 21/28* (2013.01); *H01Q 1/241* (2013.01)

(58) Field of Classification Search
CPC .... H01Q 1/241; H01Q 1/3208; H01Q 1/3216; H01Q 1/3275; H01Q 1/42; H01Q 1/325; H01Q 1/40; H01Q 1/405; H01Q 9/30; H01Q 9/32; H01Q 9/34; H01Q 9/36; H01Q 9/38; H01Q 9/40; H01Q 9/42; H01Q 19/10; H01Q 19/104; H01Q 19/106; H01Q 19/18; H01Q 19/185; H01Q 19/28; H01Q 19/32;
(Continued)

(56) References Cited

U.S. PATENT DOCUMENTS

| | | |
|---|---|---|
| 8,217,850 B1 | 7/2012 | Jennings et al. |
| 9,093,750 B2 | 7/2015 | Thiam et al. |

(Continued)

FOREIGN PATENT DOCUMENTS

| | | |
|---|---|---|
| EP | 2348576 A1 * | 7/2011 |
| JP | 2004-088198 A | 3/2004 |
| WO | 2017-191811 A1 | 11/2017 |

OTHER PUBLICATIONS

International Preliminary Report on Patentability issued Jan. 31, 2023 in corresponding International Patent Application No. PCT/JP2021/027479 (English translation only), 5 pages.

*Primary Examiner* — Robert Karacsony
(74) *Attorney, Agent, or Firm* — XSENSUS LLP

(57) ABSTRACT

An antenna device for vehicle (10A) includes an antenna base (100), an antenna case (600) forming an accommodation space together with the antenna base (100), a first monopole antenna (210) accommodated in the accommodation space, and a first parasitic element (300) provided above the first monopole antenna (210).

20 Claims, 14 Drawing Sheets

(58) Field of Classification Search
CPC ........ H01Q 21/28; H01Q 21/29; H01Q 25/00; H01Q 25/005
See application file for complete search history.

(56) References Cited

U.S. PATENT DOCUMENTS

| | | | | |
|---|---|---|---|---|
| 10,333,208 | B2 | 6/2019 | Ayatollahi et al. | |
| 2003/0137463 | A1* | 7/2003 | Shimizu | H01Q 1/38 343/711 |
| 2005/0195124 | A1* | 9/2005 | Puente Baliarda | H01Q 9/0414 343/893 |
| 2016/0064807 | A1* | 3/2016 | Reed | H01Q 21/28 343/749 |
| 2017/0317409 | A1 | 11/2017 | Ayatollahi et al. | |
| 2018/0019512 | A1* | 1/2018 | Ortigosa | H01Q 1/241 |

* cited by examiner

ANTENNA DEVICE FOR VEHICLE

CROSS-REFERENCE TO RELATED APPLICATIONS

The present application is based on PCT filing PCT/JP2021/027479, filed Jul. 26, 2021, which claims priority to Japanese Patent Application No. 2020-126223 filed on Jul. 27, 2020, the entire disclosure of each is incorporated herein by reference.

TECHNICAL FIELD

The present invention relates to an antenna device for vehicle.

BACKGROUND ART

In recent years, various antenna devices for vehicle including cellular antennas have been developed. For example, in Patent Document 1, a cellular antenna includes an insulating substrate standing vertically with respect to an antenna base and a conductive part provided on the insulating substrate. In Patent Document 2, a cellular antenna is formed by bending a sheet metal.

RELATED DOCUMENT

Patent Document

Patent Document 1: Pamphlet of International Publication No. WO2017/191811

Patent Document 2: U.S. Pat. No. 9,093,750

SUMMARY OF THE INVENTION

Technical Problem

In recent years, there has been an increasing demand for a fifth-generation (5G) mobile communication system, especially for a frequency band below 6 GHz, such as Sub-6 and Frequency Range 1 (FR1). In recent years, such demand has required high gain in a wide band including a high-frequency band such as 5 GHz to 6 GHz. Simultaneously, a reduction in size of an antenna has been also required. When the size of the antenna is reduced, on the other hand, the cellular antenna alone constituted by the conductive part provided on the insulating substrate or the bent sheet metal or the like as disclosed in for example Patent Documents 1 and 2, may have difficult to secure a gain of the high-frequency band in a horizontal plane direction, that is, a gain of the high-frequency band in a desired direction.

An example of an object of the present invention is to secure a gain of the high-frequency band in a desired direction while reducing the size of the antenna. Other object of the present invention will become apparent from the description herein.

Solution to Problem

An aspect of the present invention is an antenna device for vehicle including:

an antenna base;

an antenna case forming an accommodation space together with the antenna base;

a monopole antenna accommodated in the accommodation space; and a parasitic element provided above the monopole antenna.

Advantageous Effects of Invention

According to the aspect of the present invention, a gain of the high-frequency band in a desired direction can be secured while reducing the size of the antenna.

DESCRIPTION OF EMBODIMENTS

Hereinafter, embodiments of the present invention will be described with reference to the drawings. In all drawings, the same constituent components are denoted by the same reference signs, and detailed explanation thereof will not be repeated.

In the present specification, ordinal numbers, such as "first", "second", and "third", are attached only for distinguishing components to which the same names are attached unless specifically limited, and do not mean particular features (for example, an order or a degree of importance) of the components.

Figure 1:
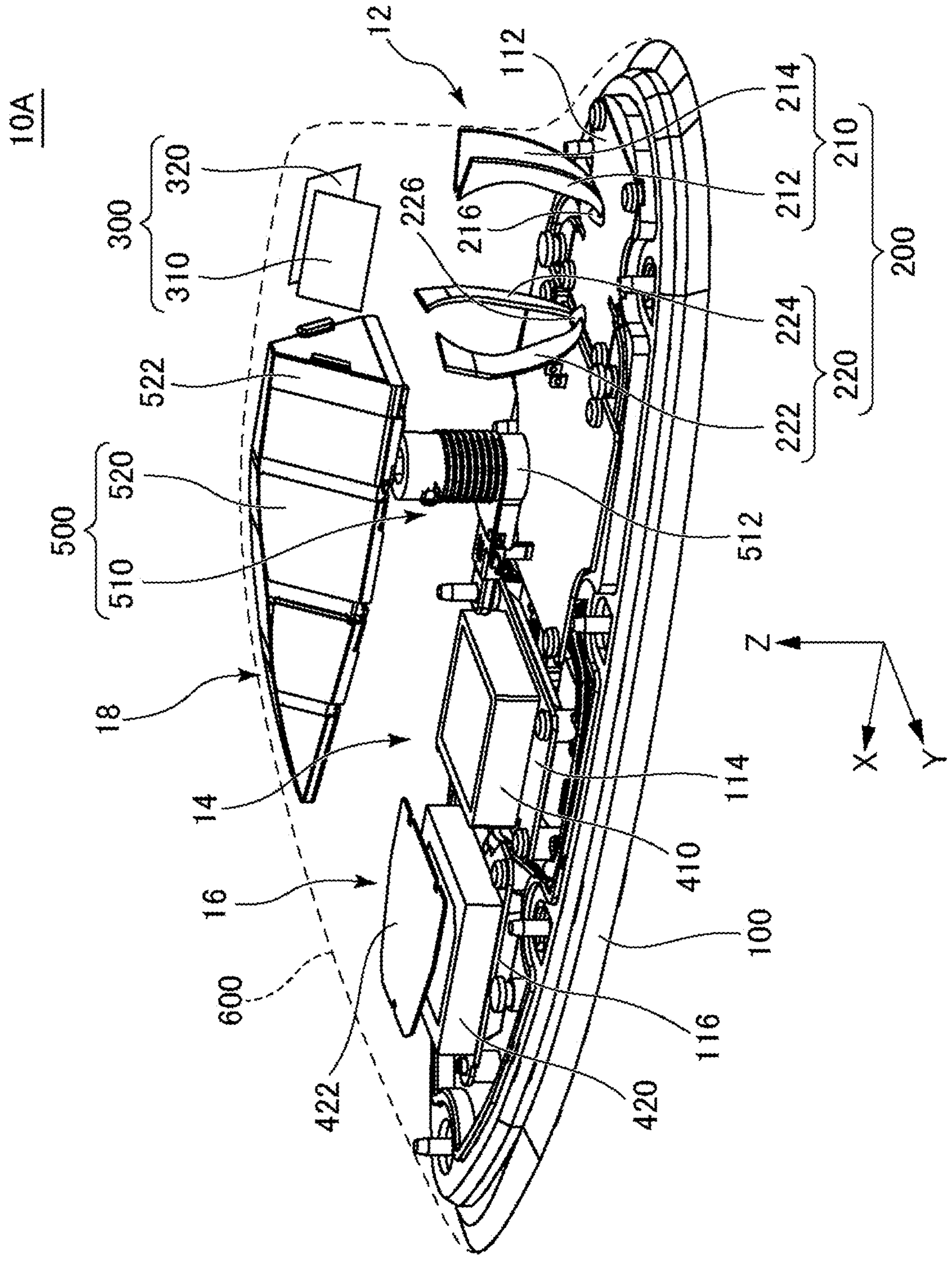
FIG. 1 is a perspective view of an antenna device for vehicle according to Embodiment 1.

FIG. 1 is a perspective view of an antenna device 10A for vehicle according to Embodiment 1.

In FIG. 1, a first direction X, a second direction Y, and a third direction Z indicate a front-rear direction, a left-right direction, and an up-down direction of the antenna device 10A for vehicle, respectively. A positive direction of the first direction X, which is a direction of an arrow indicating the first direction X, indicates a forward direction of the antenna device 10A for vehicle. A negative direction of the first direction X, which is a direction opposite to the arrow indicating the first direction X, indicates a rearward direction of the antenna device 10A for vehicle. A positive direction of the second direction Y, which is a direction of an arrow indicating the second direction Y, indicates a left direction of the antenna device 10A for vehicle. A negative direction of the second direction Y, which is a direction opposite to the arrow indicating the second direction Y, indicates a right direction of the antenna device 10A for vehicle. A positive direction of the third direction Z, which is a direction of an arrow indicating the third direction Z, indicates an upward direction of the antenna device 10A for vehicle. A negative direction of the third direction Z, which is a direction opposite to the arrow indicating the third direction Z, indicates a downward direction of the antenna device 10A for vehicle. A horizontal plane direction in the present embodiment means a direction parallel to an XY plane. The same applies to FIGS. 2, 9 and 14 which will be described later.

The antenna device 10A for vehicle includes an antenna base 100, a first antenna portion 12, a second antenna portion 14, a third antenna portion 16, a fourth antenna portion 18, and an antenna case 600. The antenna case 600 covers the antenna base 100 from above and forms an accommodation space. The first antenna portion 12, the second antenna portion 14, the third antenna portion 16, and the fourth antenna portion 18 are accommodated in the accommodation space of the antenna case 600. In FIG. 1, the antenna case 600 is illustrated in a transparent manner.

The antenna base 100 is mounted on a roof of a vehicle. The roof is a ground.

The first antenna portion 12 has a first substrate 112, an antenna element 200 and a first parasitic element 300.

The antenna element 200 is provided on the first substrate 112 disposed on antenna base 100. The first substrate 112 is, for example, a printed circuit board (PCB).

The antenna element 200 has a plurality of monopole antennas. Specifically, the antenna element 200 has a first monopole antenna 210 and a second monopole antenna 220. The first monopole antenna 210 includes a first section 212 and a second section 214. The second monopole antenna 220 includes a third section 222 and a fourth section 224. The first monopole antenna 210 and the second monopole antenna 220 are connected to a first port 216 and a second port 226 provided on the first substrate 112, respectively. Since the first section 212 and the second section 214 connected to the first port 216, and the third section 222 and the fourth section 224 connected to the second port 226 have a self-similar shape which will be described later, the first monopole antenna 210 and the second monopole antenna 220 can operate in a wide band. The antenna element 200 may have only a single monopole antenna. Each of the first monopole antenna 210 and the second monopole antenna 220 is a telematics antenna such as a cellular antenna. For example, each of the first monopole antenna 210 and the second monopole antenna 220 at least one of transmits and receives vertical polarization waves. However, each of the first monopole antenna 210 and the second monopole antenna 220 may be an antenna different from the cellular antenna, such as a vehicle-to-everything (V2X) antenna or a Wi-Fi (registered trademark) antenna.

In the present embodiment, the monopole antenna is an antenna that has a feeding portion facing a ground such as the roof of the vehicle and has, as a radiating element, a section provided on an opposite side of the feeding portion from the ground and having a length of approximately ¼ of a wavelength of a lower limit of an operating frequency band. In such a structure, the monopole antenna can operate in such a way that another virtual radiating element is disposed on an opposite side of the ground from the section. For example, the monopole antenna can operate in a similar way to a quasi-tapered slot antenna or a quasi-bow-tie antenna.

The first monopole antenna 210 is composed of a sheet metal, for example. In the present embodiment, the first monopole antenna 210 is formed by bending a substantially U-shaped sheet metal. The first monopole antenna 210 may be composed of a conductive pattern provided on a substrate such as a PCB.

A lower end of the first section 212 and a lower end of the second section 214 are connected to the first port 216. The first port 216 serves as a feeding portion for the first monopole antenna 210. The first section 212 and the second section 214 have a symmetrical shape with respect to the first port 216. Specifically, a width of the first section 212 increases stepwise or gradually from the lower end to an upper end of the first section 212. A width of the first section 212 near the upper end of the first section 212 is therefore wider than a width of the first section 212 near the lower end of the first section 212. The same applies to a width of the second section 214. Thus, the first monopole antenna 210 has a self-similar shape. The self-similar shape of the first monopole antenna 210 allows the first monopole antenna 210 to operate in a wide band.

Examples of the antenna having the self-similar shape include an antenna of which the shape is the self-similar shape even if a scale (size ratio) is changed, such as a biconical antenna and a bow-tie antenna. As a premise of the antenna having the self-similar shape, electrical characteristics of the antenna exhibit the same characteristics in principle even if the antenna size or frequency is changed. In actual design, for impedance adjustment or the like, the antenna may have a shape as the first monopole antenna 210 in the present embodiment by deforming the shape of isosceles triangular radiating elements such as a biconical antenna and a bow-tie antenna. Even in such a case, a certain electrical characteristics achieved from the self-similar shape may be used.

The second monopole antenna 220 is disposed in front of the first monopole antenna 210. The second monopole antenna 220 is composed of a sheet metal, for example. In the present embodiment, the second monopole antenna 220 is composed of a substantially U-shaped sheet metal. The second monopole antenna 220 may be composed of a conductive pattern provided on a substrate such as a PCB.

A lower end of the third section 222 and a lower end of the fourth section 224 are connected to the second port 226. The second port 226 serves as a feeding portion for the second monopole antenna 220. The third section 222 and the fourth section 224 have a symmetrical shape with respect to the second port 226. Specifically, a width of the third section 222 increases stepwise or gradually from the lower end to an upper end of the third section 222. A width of the third section 222 near the upper end of the third section 222 is therefore wider than a width of the third section 222 near the lower end of the third section 222. The same applies to a width of the fourth section 224. Thus, the second monopole antenna 220 has a self-similar shape.

The first monopole antenna 210 may have only one of the first section 212 and the second section 214. Similarly, the second monopole antenna 220 may have only one of the third section 222 and the fourth section 224. That is, the antenna device 10A for vehicle may include at least one section. For example, the antenna device 10A for vehicle may include only one of the first section 212, the second section 214, the third section 222, and the fourth section 224.

The shape of the first monopole antenna 210 or the second monopole antenna 220 is not limited to the substantially U shape according to the present embodiment. For example, each monopole antenna may have a rod shape, a plate shape, a plane shape, a fan shape, or a substantially V shape. Each monopole antenna may not be a self-similar shape.

The first parasitic element 300 is provided above the antenna element 200. Specifically, projection of the first parasitic element 300 to the negative direction of the third direction Z overlaps at least a part of the first monopole antenna 210, the second monopole antenna 220, and a region between the first monopole antenna 210 and the second monopole antenna 220. For example, the projection of the first parasitic element 300 to the negative direction of the third direction Z may overlap one of the first monopole antenna 210 and the second monopole antenna 220, and may not overlap the other of the first monopole antenna 210 and the second monopole antenna 220.

The first parasitic element 300 functions as a secondary radiating element. The secondary radiating element means an element that enhances directivity of a gain in a predetermined direction, such as a horizontal plane direction, of radio waves generated and radiated by the antenna element 200 as a primary radiating element. The first parasitic element 300 is electrically coupled to the antenna element 200 at a predetermined frequency such as 5.5 GHz to 6.0 GHz. Specifically, the first parasitic element 300 functions as an element to enhance the directivity of a gain in the horizontal plane direction at a predetermined frequency of at least one of the first monopole antenna 210 and the second monopole antenna 220. The first parasitic element 300 functions as a quasi-array antenna element with respect to the antenna element 200 at a predetermined frequency such as 5.5 GHz to 6.0 GHz. It is thus as if the antenna device 10A for vehicle includes two wave sources of a wave source constituted by the antenna element 200 and a wave source constituted by the first parasitic element 300. When the first parasitic element 300 is provided, a gain of the high-frequency band in the horizontal plane direction can be secured while reducing the size of the antenna element 200, as compared with a case where the first parasitic element 300 is not provided. As will be described later with reference to FIGS. 3 to 8, when the first parasitic element 300 is provided, a gain at a frequency of, for example, 5.5 GHz to 6.0 GHz can be increased as compared with a case where the first parasitic element 300 is not provided. As a result, the radiating elements including the antenna element 200 and the first parasitic element 300 have the directivity in the horizontal plane direction.

The gain in the horizontal plane direction of the antenna element 200 can be enhanced by appropriately adjusting a distance between the antenna element 200 and the first parasitic element 300. For example, a distance between an end portion of the first parasitic element 300 on a side of the antenna element 200 and an end portion of the antenna element 200 on a side of the first parasitic element 300 may be, for example, approximately $\lambda/2$, such as $\lambda/2-\lambda/4$ or more and $\lambda/2+\lambda/4$ or less. Here, $\lambda$ is a wavelength of the frequency of operating frequencies of the antenna element 200 at which gain is enhanced by the first parasitic element 300. When the distance is approximately $\lambda/2$, the gain in the horizontal plane direction of the antenna element 200 can be enhanced by the first parasitic element 300 as compared with a case where the distance is relatively largely different from approximately $\lambda/2$.

The first parasitic element 300 is composed of a plurality of element parts spaced apart from each other. Specifically, the first parasitic element 300 is composed of a first element part 310 and a second element part 320. The first parasitic element 300 may be composed by only a single element part or three or more element parts. When the first parasitic element 300 is composed of a plurality of element parts, the gain can be significantly increased by the first parasitic element 300 by placing the plurality of element parts in an appropriate arrangement, as compared with a case where the first parasitic element 300 is composed of a single element part. The first element part 310 and the second element part 320 are disposed symmetrically with respect to the XZ plane. Specifically, the first element part 310 is tilted from the horizontal plane direction such that a lower portion of the first element part 310 is located on a side of the positive direction in the second direction Y from the upper portion of the first element part 310. The second element part 320 is, on the other hand, tilted from the horizontal plane direction such that a lower portion of the second element part 320 is located on a side of the negative direction in the second direction Y from an upper portion of the second element part 320. In this case, the first parasitic element 300 is more easily accommodated in the accommodation space of the antenna case 600, as compared to a case where the first element part 310 and the second element part 320 are disposed parallel to the third direction Z. The first element part 310 and the second element part 320 may be disposed in parallel to the third direction Z.

A first parasitic element having at least one element part may be provided above the first monopole antenna 210, and another first parasitic element having at least one element part may be provided above the second monopole antenna 220. In this case, conditions such as the shape and arrangement of each first parasitic element above each monopole antenna can match conditions more suitable for each monopole antenna, and each monopole antenna and each first parasitic element can be operated more preferably, as compared to a case where only one first parasitic element is provided above the first monopole antenna 210 and the second monopole antenna 220.

When a single first parasitic element is provided above a single monopole antenna, at least one of front and rear ends of the section of the monopole antenna may be substantially aligned with at least one of front and rear ends of the element part of the first parasitic element, respectively, in the third direction Z. Since the front end and rear end of the section of the monopole antenna and the front end and rear end of the element part of the first parasitic element tend to be at a high potential, the monopole antenna and the first parasitic element are easily electrically coupled by aligning the front end and rear end of the section of the monopole antenna and the front end and rear end of the element part of the first parasitic element.

The first element part 310 has a quadrilateral shape having a length in the front-rear direction of the antenna device 10A for vehicle longer than a length thereof in the up-down direction of the antenna device 10A for vehicle. A length of a part of the first element part 310 where a standing wave is formed may be approximately $\lambda/2$, such as $\lambda/2-\lambda/4$ or more and $\lambda/2+\lambda/4$ or less. In particular, when vertical polarization waves are transmitted and received by the antenna element 200 and the first parasitic element 300, a length of the first element part 310 in the up-down direction of the antenna device 10A for vehicle may be, for example, approximately $\lambda/2$, such as $\lambda/2-\lambda/4$ or more and $\lambda/2+\lambda/4$ or less. Here, $\lambda$ is a wavelength of the frequency of operating frequencies of the antenna element 200 at which gain is enhanced by the first parasitic element 300. The first element part 310 having a length approximately $\lambda/2$ facilitates resonance in the first element part 310, and the gain is more enhanced with ease by the first element part 310. In an operating frequency band of the operating frequencies of the antenna element 200 shorter than a frequency at which gain is enhanced, coupling of the first monopole antenna 210 or the second monopole antenna 220 and the first parasitic element 300 becomes weak, and the influence of the first parasitic element 300 can be weakened. The first element part 310 may be a polygon other than a quadrilateral, such as a triangle, pentagon, hexagon, or octagon. The same applies to the second element part 320 as well.

The first parasitic element 300 is composed of a sheet metal, for example. Alternatively, the first parasitic element 300 may be a conductive pattern. For example, when a holder such as a resin holder that holds the antenna element 200 is provided on the first substrate 112, the sheet metal forming the first parasitic element 300 may be supported by the holder, or a conductive pattern forming the first parasitic element 300 may be formed on the holder. Alternatively, the first parasitic element 300 may be provided in antenna case 600.

The second antenna portion 14 has a second substrate 114 and a first satellite antenna 410.

The first satellite antenna 410 is provided on the second substrate 114 disposed on the antenna base 100. The first satellite antenna 410 is, for example, a global navigation satellite system (GNSS) antenna. The second substrate 114 is, for example, a PCB. The first satellite antenna 410 is a patch antenna. The first satellite antenna 410 is disposed forward of the antenna element 200.

The third antenna portion 16 has a third substrate 116, a second satellite antenna 420, and a second parasitic element 422.

The second satellite antenna 420 is provided on the third substrate 116 disposed on the antenna base 100. The second satellite antenna is, for example, a Sirius XM (SXM) antenna. The third substrate 116 is, for example, a PCB. The second satellite antenna 420 is a patch antenna. The second satellite antenna 420 is disposed forward of the first satellite antenna 410. The second parasitic element 422 is disposed on the second satellite antenna 420.

The fourth antenna portion 18 has an amplitude modulation/frequency modulation (AM/FM) radio broadcast antenna 500, a first holder 512, and a second holder 522.

The AM/FM radio broadcast antenna 500 has a helical element 510 and a capacitively-loaded element 520. The helical element 510 is wound along a groove provided in the first holder 512, which is provided on the antenna base 100, or held by a protrusion provided on the first holder 512. The capacitively-loaded element 520 is held by the second holder 522 connected to the first holder 512. The helical element 510 and the capacitively-loaded element 520 are electrically connected to each other. The AM/FM radio broadcast antenna 500 is capable of receiving AM/FM broadcasting by the helical element 510 and the capacitively-loaded element 520. The AM/FM radio broadcast antenna 500 should be capable of receiving at least one of the AM radio broadcasting and the FM radio broadcasting.

The first parasitic element 300 may function as a part of the AM/FM radio broadcast antenna 500 as will be described later in detail in Embodiment 2 described later. In this case, the first parasitic element 300 may be connected to the capacitively-loaded element 520 through a filter, such as a notch filter or a low-pass filter, that cuts off a frequency at which the gain is increased by the first parasitic element 300. By providing the filter, the first parasitic element 300 can be a part of the capacitively-loaded element forming the AM/FM radio broadcast antenna 500. As a result, a size (area) of the capacitively-loaded element of the AM/FM radio broadcast antenna 500 can be increased, and a performance of the AM/FM radio broadcast antenna 500 can be improved. A rear portion of the second holder 522 may extend rearward to attach the first parasitic element 300 to the extended part of the second holder 522.

In the present embodiment, the first antenna portion 12, the second antenna portion 14, and the third antenna portion 16 are formed using different substrates. However, at least two of the first antenna portion 12, the second antenna portion 14, and the third antenna portion 16 may be formed using the same substrate.

Figure 2:
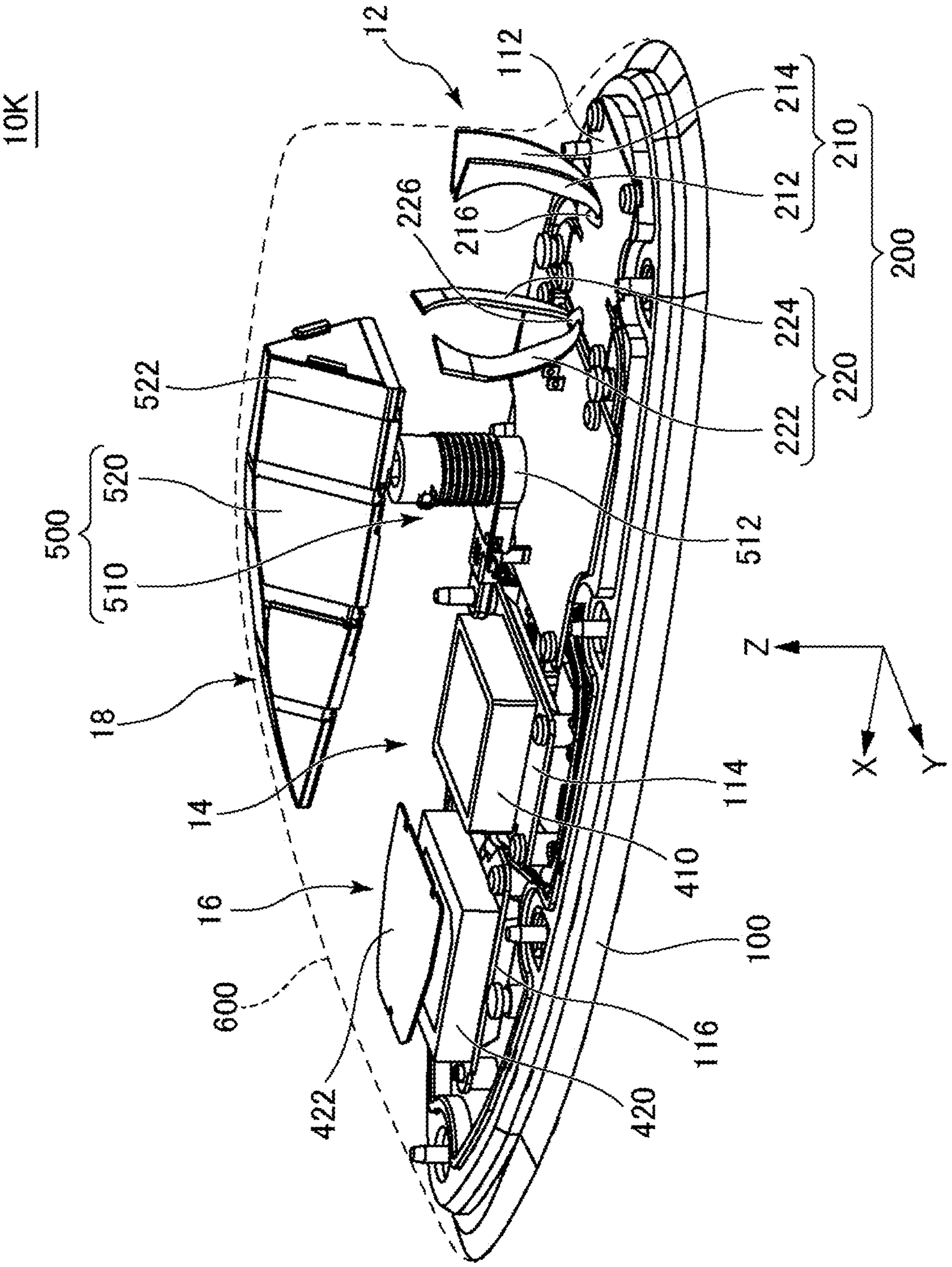
FIG. 2 is a perspective view of an antenna device for vehicle according to a comparative example.

FIG. 2 is a perspective view of an antenna device 10K for vehicle according to a comparative example. The antenna device 10K for vehicle according to the comparative example is the same as the antenna device 10A for vehicle according to Embodiment 1, except that the first parasitic element 300 is not provided.

Figure 3:
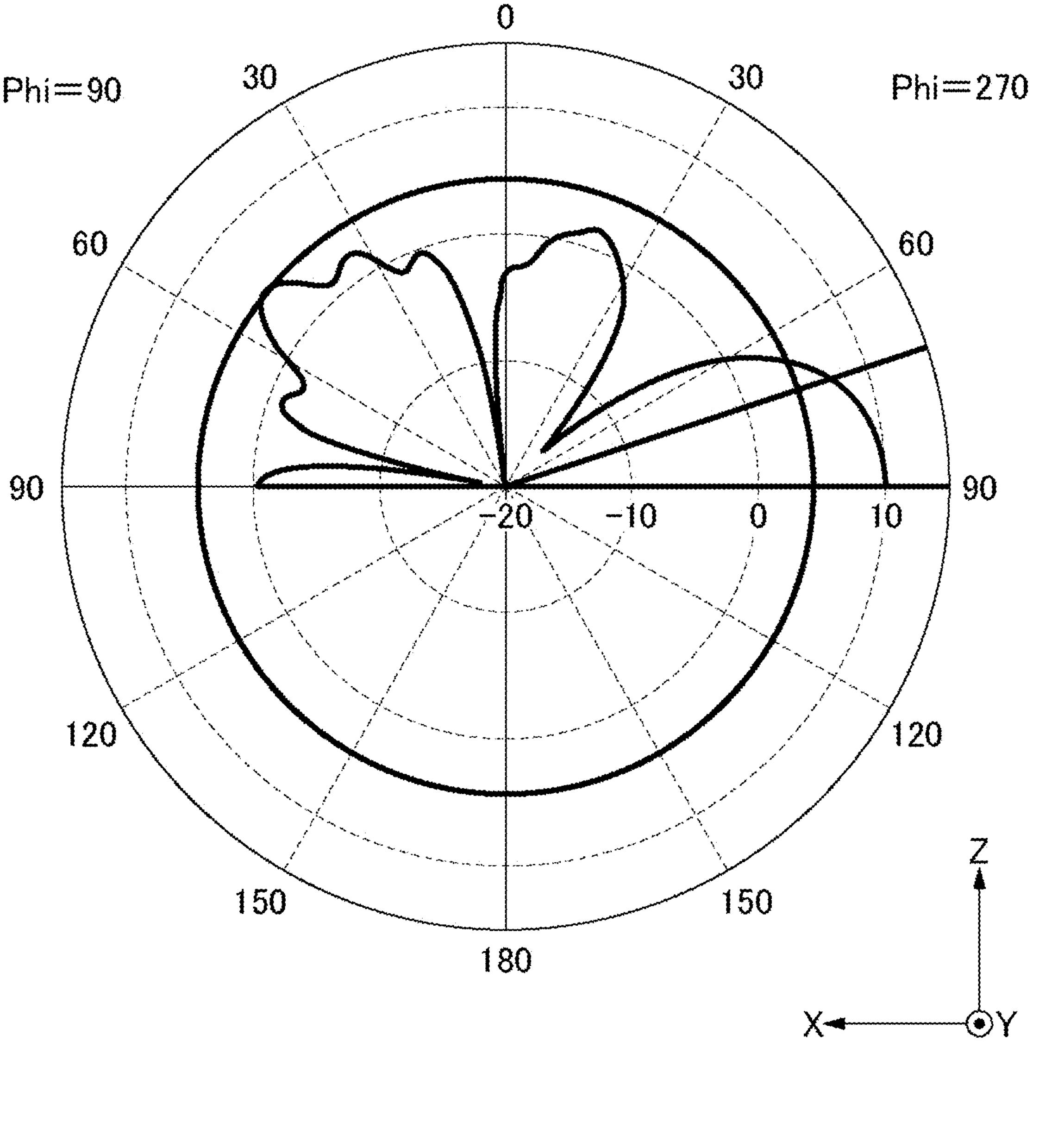
FIG. 3 is a graph showing a radiation pattern of a gain at a frequency of 6 GHz of a first monopole antenna of the antenna device for vehicle according to Embodiment 1.
Figure 4:
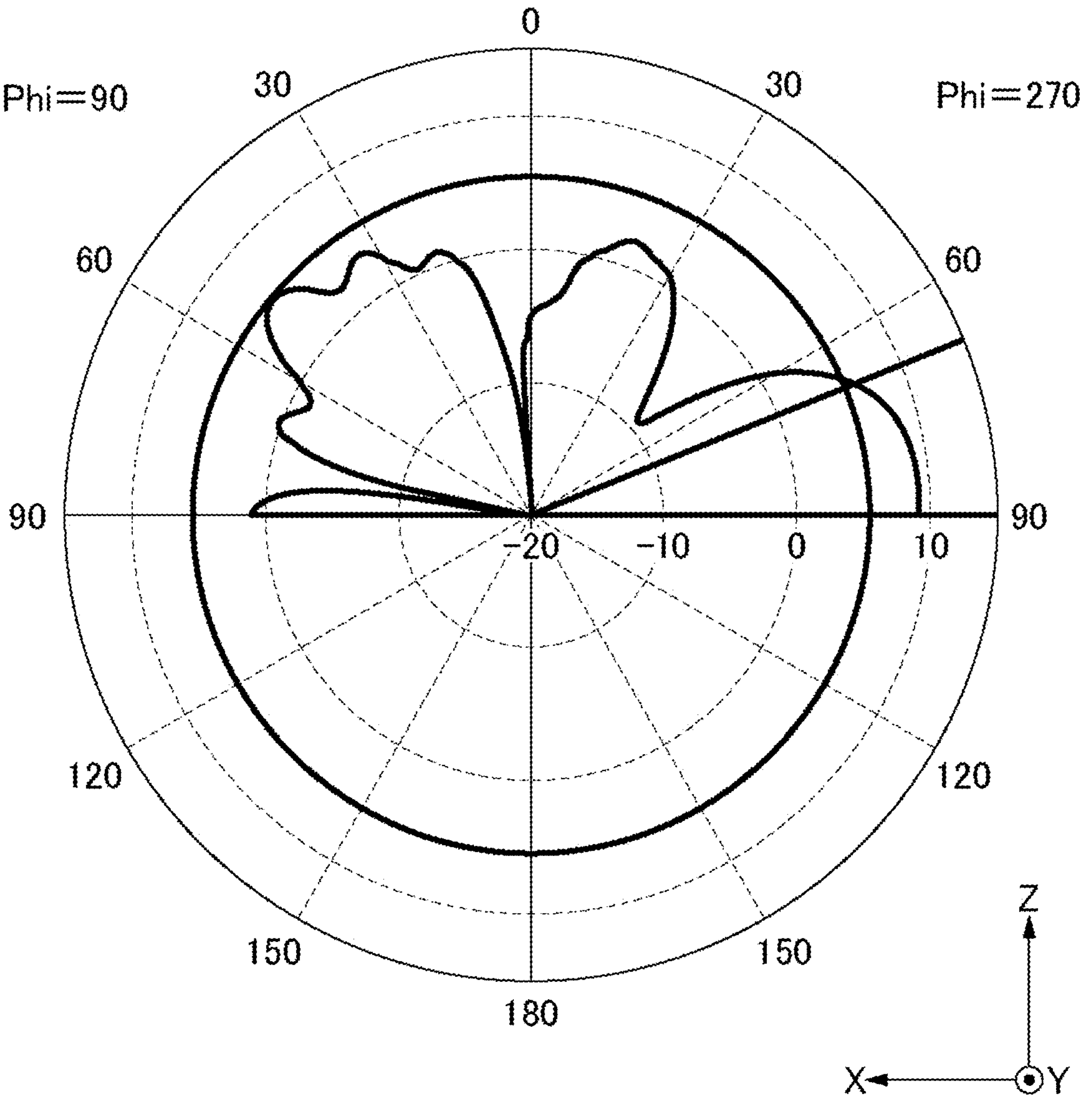
FIG. 4 is a graph showing a radiation pattern of a gain at a frequency of 6 GHz of the first monopole antenna of the antenna device for vehicle according to the comparative example.
Figure 5:
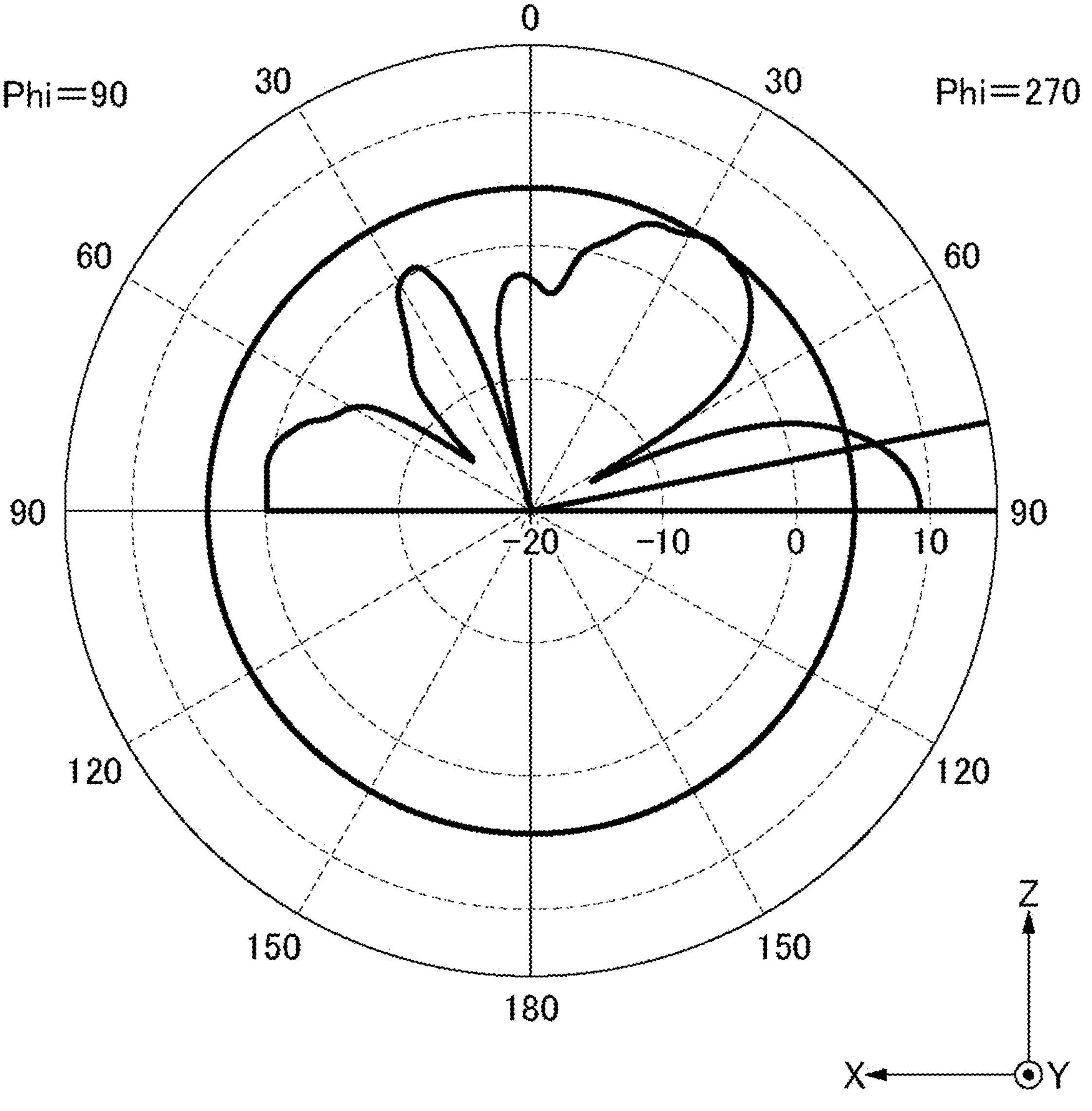
FIG. 5 is a graph showing a radiation pattern of a gain at a frequency of 6 GHz of a second monopole antenna of the antenna device for vehicle according to Embodiment 1.
Figure 6:
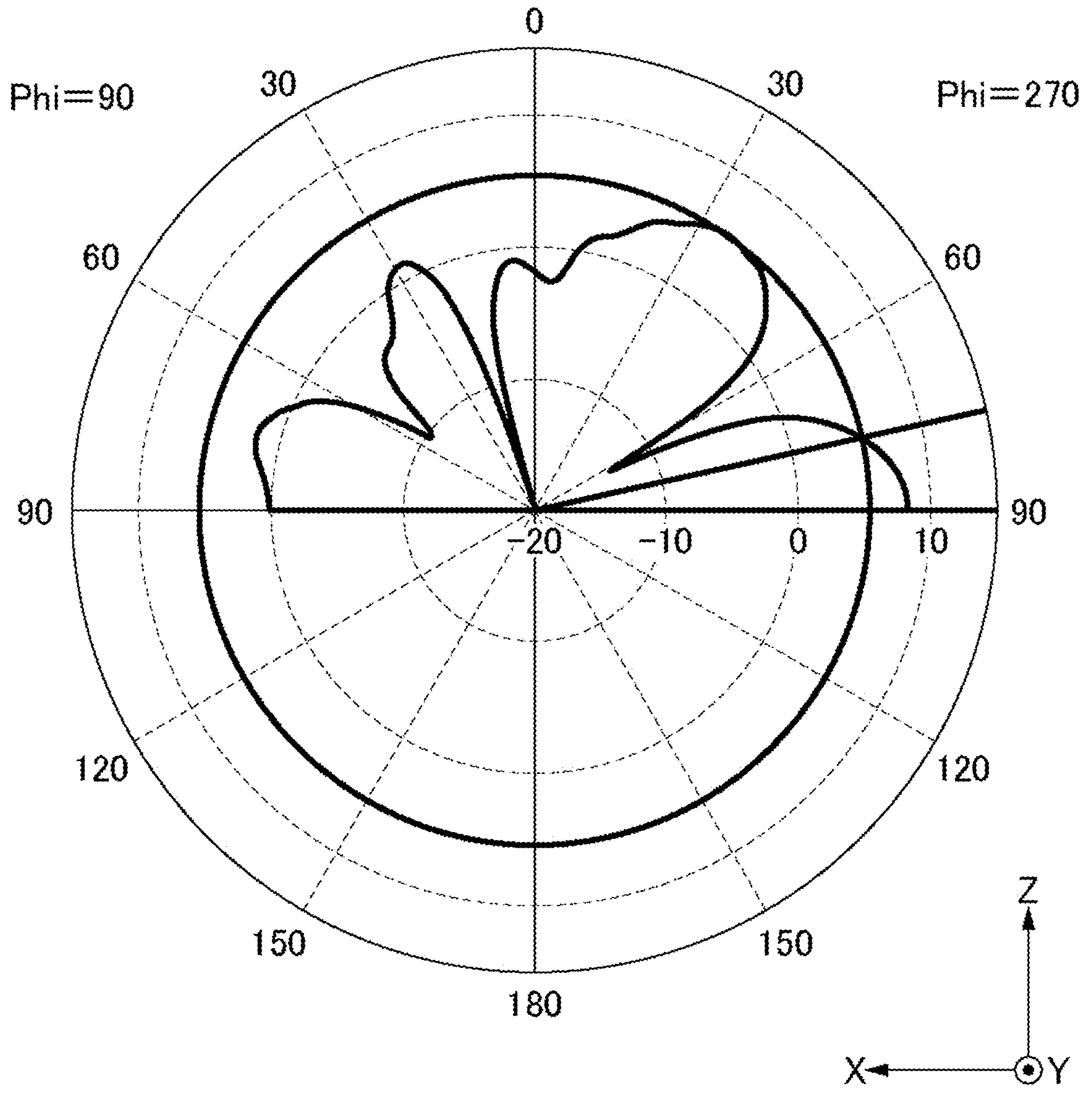
FIG. 6 is a graph showing a radiation pattern of a gain at a frequency of 6 GHz of the second monopole antenna of the antenna device for vehicle according to the comparative example.

FIG. 3 is a graph showing a radiation pattern of a gain at a frequency of 6 GHz of the first monopole antenna 210 of the antenna device 10A for vehicle according to Embodiment 1. FIG. 4 is a graph showing a radiation pattern of a gain at a frequency of 6 GHz of the first monopole antenna 210 of the antenna device 10K for vehicle according to the comparative example. FIG. 5 is a graph showing a radiation pattern of a gain at a frequency of 6 GHz of the second monopole antenna 220 of the antenna device 10A for vehicle according to Embodiment 1. FIG. 6 is a graph showing a radiation pattern of a gain at a frequency of 6 GHz of the second monopole antenna 220 of the antenna device 10K for vehicle according to the comparative example.

The first direction X, the second direction Y, and the third direction Z shown in FIGS. 3 to 6 are the same as the first direction X, the second direction Y and the third direction Z shown in FIGS. 1 and 2. In FIGS. 3 to 6, a white circle with a black dot indicating the second direction Y indicates that a direction from the back to the front of the paper surface is the positive direction of the second direction Y, and a direction from the front to the back of the paper surface is the negative direction of the second direction Y.

In each graph, broken lines radially extending from the center of the graph indicate the azimuth (unit: deg). Broken lines spreading concentrically with respect to the center of the graph indicate the gain (unit: dBi).

Comparing FIGS. 3 and 4, the gain in the negative direction of the first direction X in the horizontal plane direction of the first monopole antenna 210 according to Embodiment 1 is larger than the gain in the negative direction of the first direction X in the horizontal plane direction of the first monopole antenna 210 according to the comparative example. This result suggests that the first parasitic element 300 improves the gain in the negative direction of the first direction X of the first monopole antenna 210 at the frequency of 6 GHz.

Comparing FIGS. 5 and 6, the gain in the negative direction of the first direction X in the horizontal plane direction of the second monopole antenna 220 according to Embodiment 1 is larger than the gain in the negative direction of the first direction X in the horizontal plane direction of the second monopole antenna 220 according to the comparative example. This result suggests that the first parasitic element 300 improves the gain in the negative direction of the first direction X of the second monopole antenna 220 at a frequency of 6 GHz.

Figure 7:
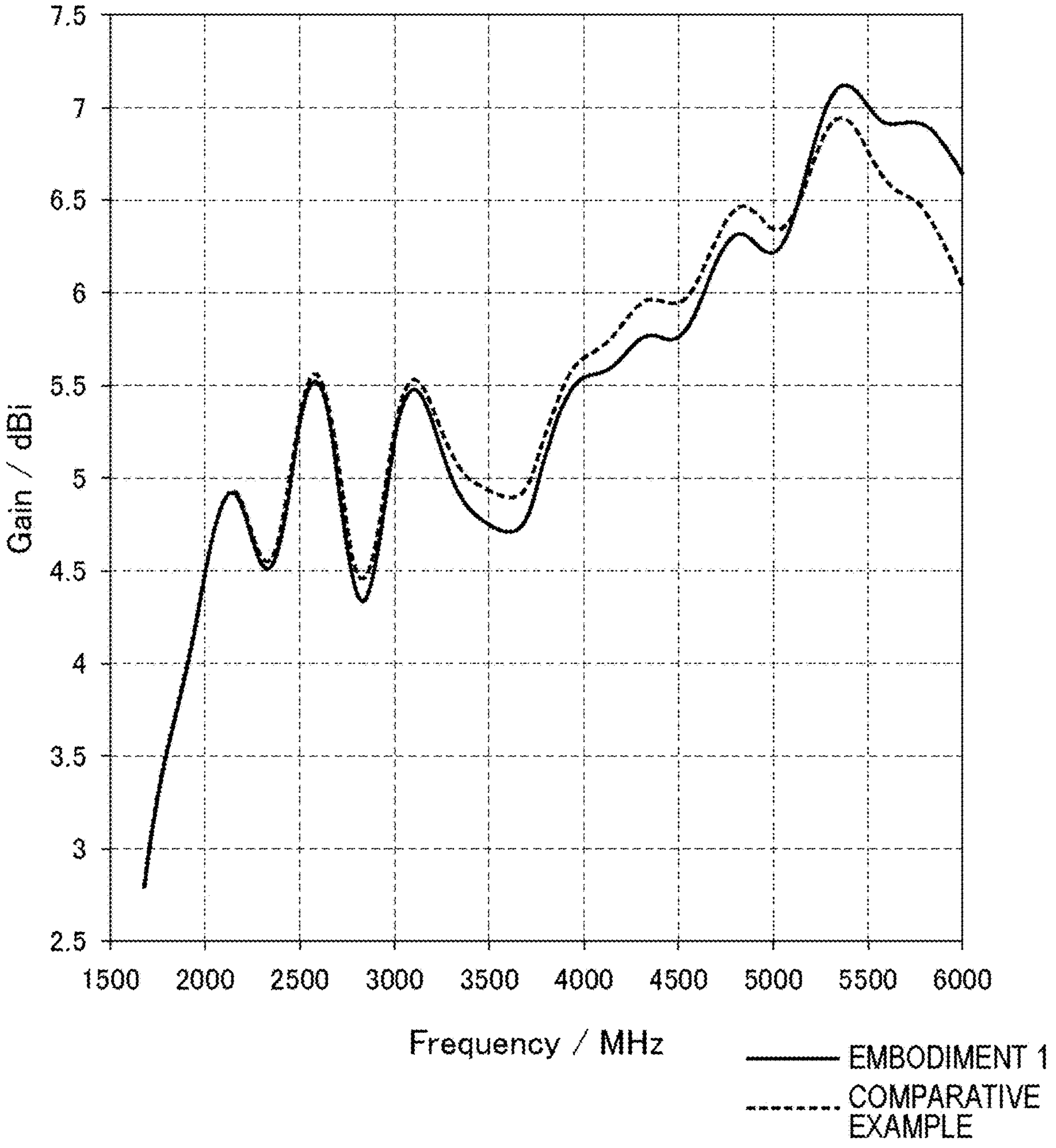
FIG. 7 is a graph showing frequency characteristics from 1.5 GHz to 6 GHz of an average gain of the first monopole antenna of the antenna device for vehicle according to Embodiment 1 in a horizontal plane direction and an average gain of the first monopole antenna of the antenna device for vehicle according to the comparative example in the horizontal plane direction.
Figure 8:
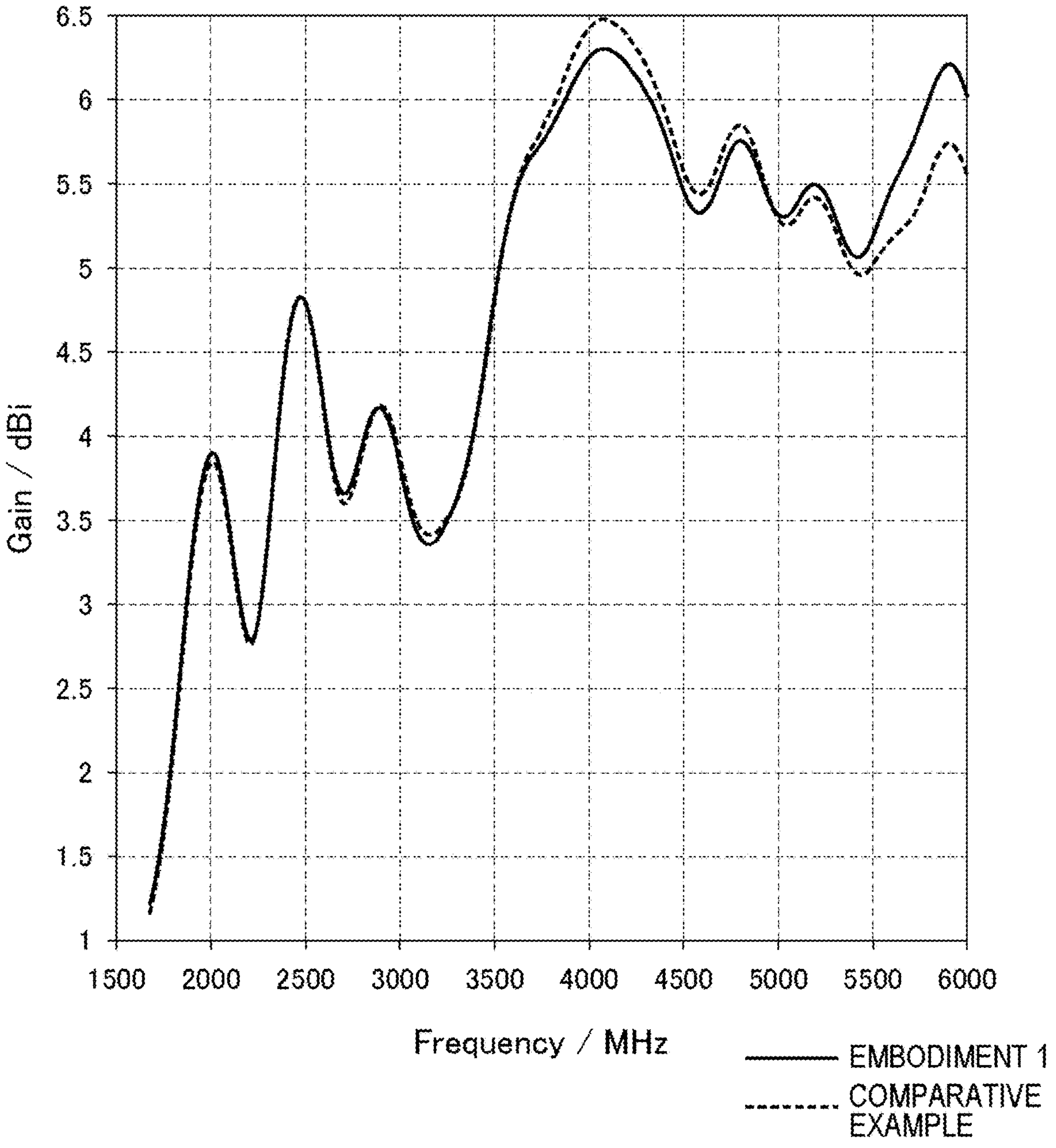
FIG. 8 is a graph showing frequency characteristics from 1.5 GHz to 6 GHz of an average gain of the second monopole antenna of the antenna device for vehicle according to Embodiment 1 in a horizontal plane direction and an average gain of the second monopole antenna of the antenna device for vehicle according to the comparative example in the horizontal plane direction.

FIG. 7 is a graph showing frequency characteristics from 1.5 GHz to 6 GHz of an average gain of the first monopole antenna 210 of the antenna device 10A for vehicle according to Embodiment 1 in a horizontal plane direction and an average gain of the first monopole antenna 210 of the antenna device 10K for vehicle according to the comparative example in the horizontal plane direction. FIG. 8 is a graph showing frequency characteristics from 1.5 GHz to 6 GHz of an average gain of the second monopole antenna 220 of the antenna device 10A for vehicle according to Embodiment 1 in a horizontal plane direction and an average gain of the second monopole antenna 220 of the antenna device 10K for vehicle according to the comparative example in the horizontal plane direction.

In FIGS. 7 and 8, a horizontal axis of the graph indicates a frequency (unit: MHz). A vertical axis of the graph indicates an average gain (unit: dBi) in the horizontal plane direction.

As shown in FIG. 7, the average gain of the first monopole antenna 210 according to Embodiment 1 in the horizontal plane direction at a frequency of 5.5 GHz to 6.0 GHz is higher than the average gain of the first monopole antenna 210 according to the comparative example in the horizontal plane direction at a frequency of 5.5 GHz to 6.0 GHz. This result suggests that the first parasitic element 300 improves the average gain of the first monopole antenna 210 in the horizontal plane direction at a frequency of 5.5 GHz to 6.0 GHz.

As shown in FIG. 8, the average gain of the second monopole antenna 220 according to Embodiment 1 in the horizontal plane direction at a frequency of 5.5 GHz to 6.0 GHz is higher than the average gain of the second monopole antenna 220 according to the comparative example in the horizontal plane direction at a frequency of 5.5 GHz to 6.0 GHz. This result suggests that the first parasitic element 300 improves the average gain of the second monopole antenna 220 in the horizontal plane direction at a frequency of 5.5 GHz to 6.0 GHz.

Figure 9:
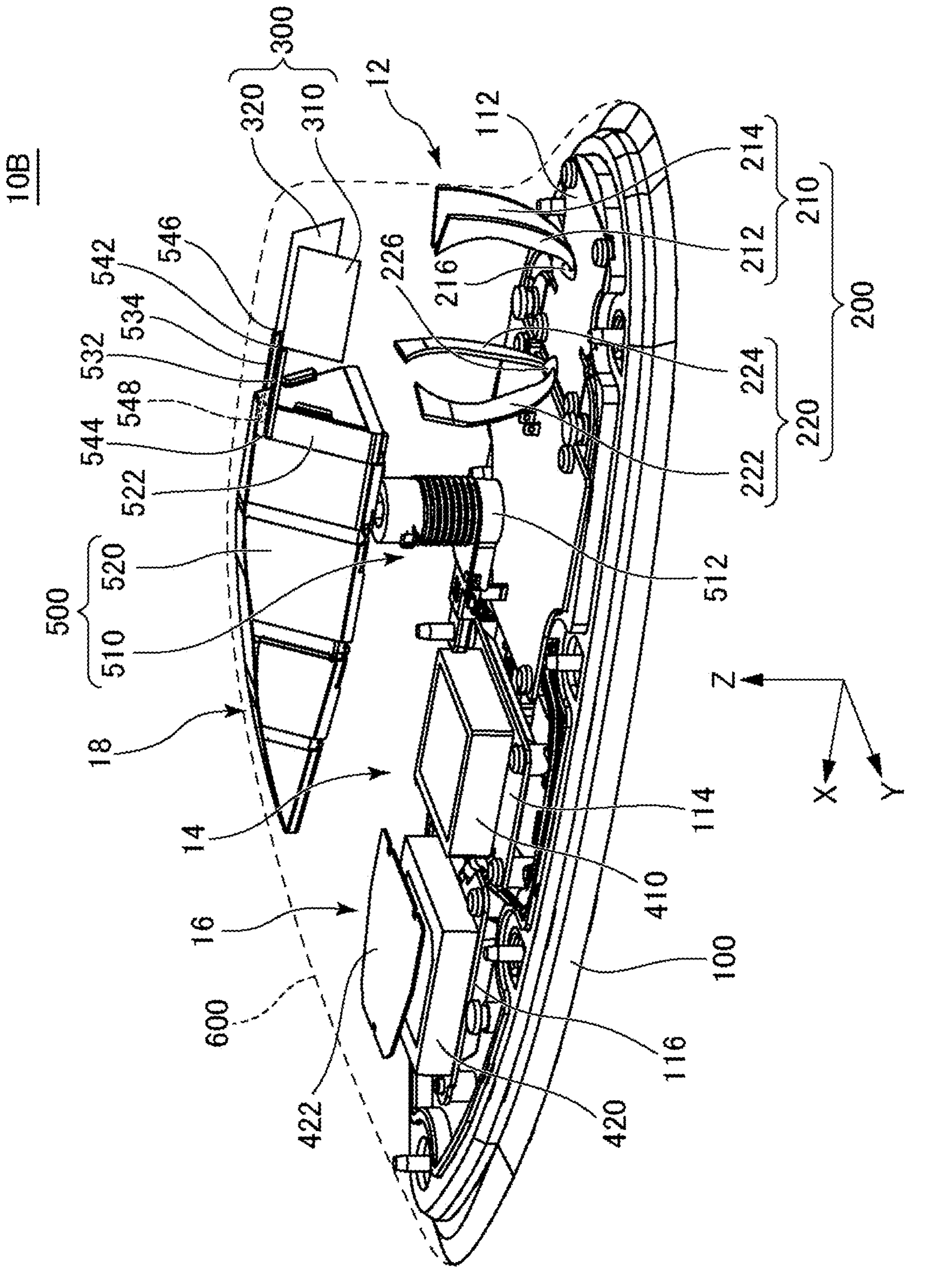
FIG. 9 is a perspective view of an antenna device for vehicle according to Embodiment 2.

FIG. 9 is a perspective view of an antenna device 10B for vehicle according to Embodiment 2. The antenna device 10B for vehicle according to Embodiment 2 is the same as the antenna device 10A for vehicle according to Embodiment 1, except for the following points.

The first parasitic element 300 functions as a part of the AM/FM radio broadcast antenna 500. Specifically, the antenna device 10B for vehicle includes a first connection conductor 532, a second connection conductor 534, a first filter 542, a second filter 544, a third filter 546, and a fourth filter 548.

The first connection conductor 532 and the second connection conductor 534 are arranged in the left-right direction of the antenna device 10B for vehicle. The first connection conductor 532 is located on a left side of the second connection conductor 534 when viewed from the rear of the antenna device 10B for vehicle. The second connection conductor 534 is located on a right side of the first connection conductor 532 when viewed from the rear of the antenna device 10B for vehicle. The first connection conductor 532 and the second connection conductor 534 are located between the first parasitic element 300 and the capacitively-loaded element 520 in the front-rear direction of the antenna device 10B for vehicle.

The first element part 310 and a left part of the capacitively-loaded element 520 are electrically connected to each other through the first filter 542, the first connection conductor 532, and the second filter 544. Specifically, a rear end portion of the first connection conductor 532 and a front end portion of the first element part 310 are electrically connected to each other through the first filter 542. A front end portion of the first connection conductor 532 and a rear end portion of the left part of the capacitively-loaded element 520 are electrically connected to each other through the second filter 544.

The second element part 320 and a right part of the capacitively-loaded element 520 are electrically connected to each other through the third filter 546, the second connection conductor 534, and the fourth filter 548. Specifically, a rear end portion of the second connection conductor 534 and a front end portion of the second element part 320 are electrically connected to each other through the third filter 546. A front end portion of the second connection conductor 534 and a rear end portion of the right part of the capacitively-loaded element 520 are electrically connected to each other through the fourth filter 548.

Each of the first filter 542, the second filter 544, the third filter 546, and the fourth filter 548 is a low-pass filter. The first parasitic element 300 and the capacitively-loaded element 520 are therefore electrically connected to each other through at least one low-pass filter. The first parasitic element 300 can be accordingly a part of the capacitively-loaded element forming the AM/FM radio broadcast antenna 500. As a result, a size (area) of the capacitively-loaded element of the AM/FM radio broadcast antenna 500 can be increased, and a performance of the AM/FM radio broadcast antenna 500 can be improved.

Figure 10:
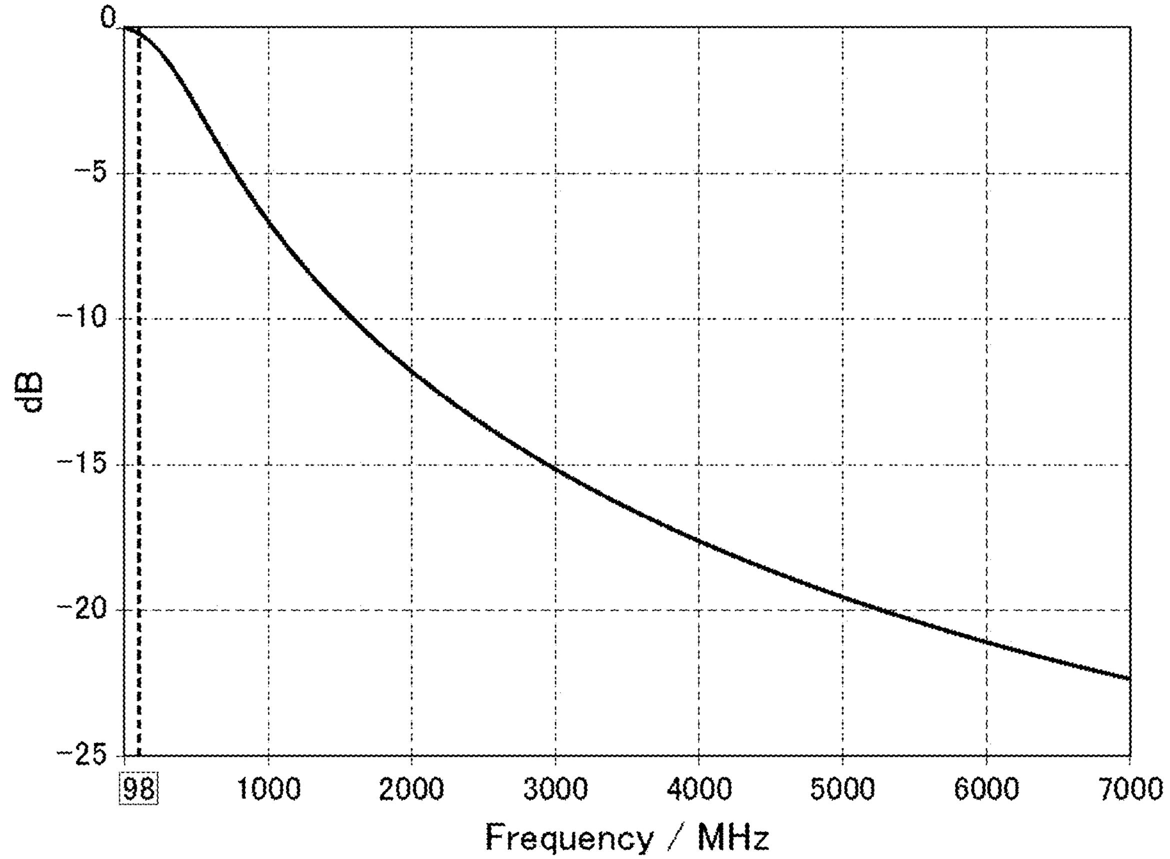
FIG. 10 is a graph showing frequency characteristics from 0 to 7 GHz of a forward transmission coefficient S21 of an S-parameter of a first filter.

FIG. 10 is a graph showing frequency characteristics from 0 to 7 GHz of a forward transmission coefficient S21 of an S-parameter of the first filter 542. The S-parameter of the first filter 542 is represented by four parameters S11, S21, S12, and S22 in a two-port network having ports 1 and 2. The parameter S11 is a reflection coefficient of a signal that is input from the port 1 and reflected at the port 1. The parameter S21 is a transmission coefficient, that is, a forward transmission coefficient, of a signal that is input from the port 1 and transmitted through the port 2. The parameter S12 is a transmission coefficient, that is, a reverse transmission coefficient, of a signal that is input from the port 2 and transmitted through the port 1. The parameter S22 is a reflection coefficient of a signal that is input from the port 2 and reflected at the port 2.

In FIG. 10, a horizontal axis of the graph indicates a frequency (unit: MHz). A vertical axis of the graph indicates an absolute value (unit: dB) of the forward transmission coefficient S21.

As shown in FIG. 10, the absolute value of the forward transmission coefficient S21 in an FM band around 98 MHz is approximately −0.2 dB. The absolute value of the forward transmission coefficient S21 in a telephone (TEL) band of 1.7 GHz to 6 GHz is, on the other hand, approximately −10 dB or less. The first filter 542 can therefore transmit an FM band signal rather than a TEL band signal. The first filter 542 can block frequencies such as 5.5 GHz to 6 GHz, at which the gain of the first monopole antenna 210 or the second monopole antenna 220 is increased by the first parasitic element 300.

The second filter 544, the third filter 546, and the fourth filter 548 also have characteristics similar to the characteristics of the first filter 542 described with reference to FIG. 10.

Figure 11:
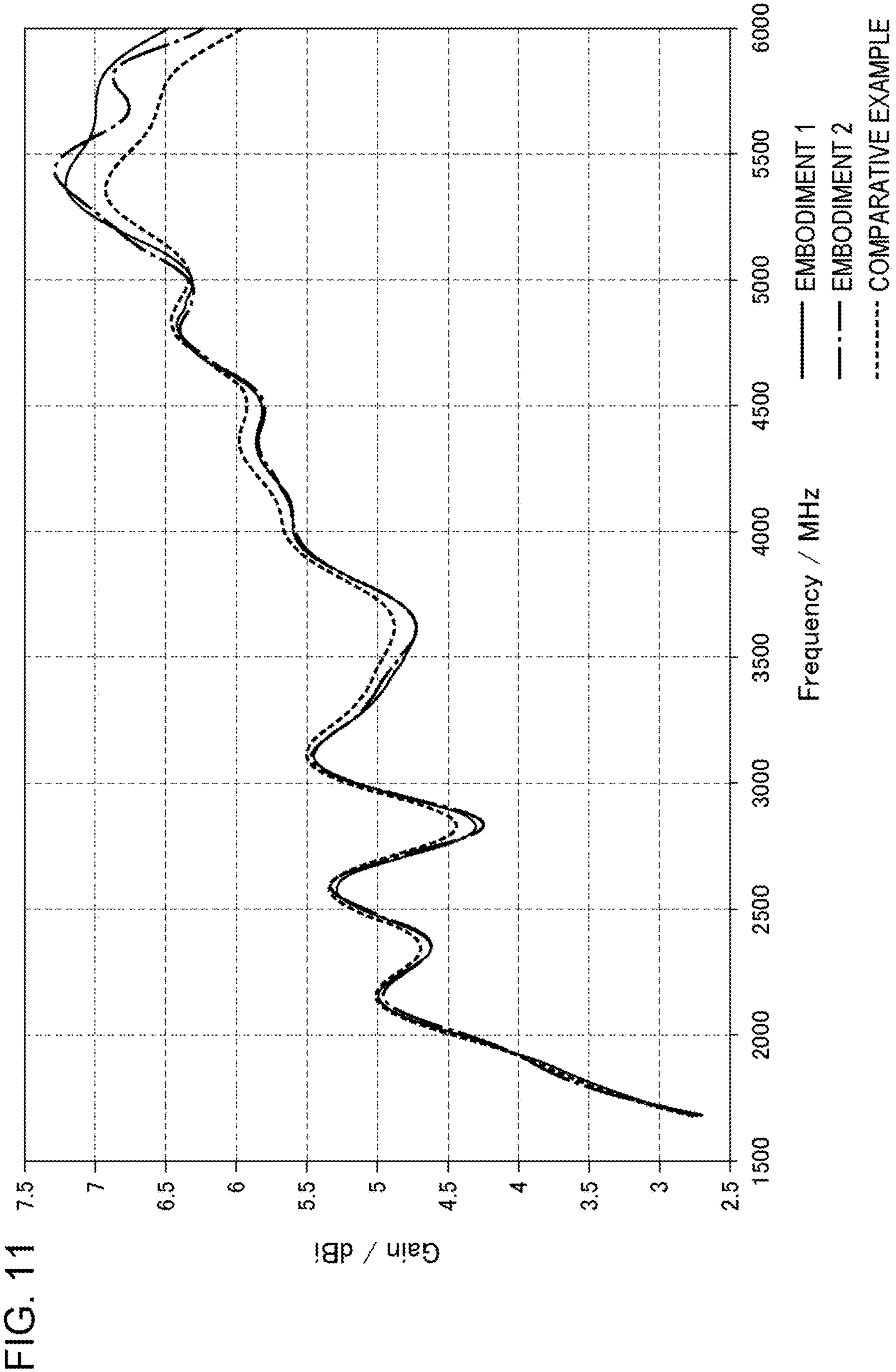
FIG. 11 is a graph showing frequency characteristics from 1.5 GHz to 6 GHz of the average gain of the first monopole antenna of the antenna device for vehicle according to Embodiment 1 in the horizontal plane direction, an average gain of the first monopole antenna of the antenna device for vehicle according to Embodiment 2 in the horizontal plane direction, and the average gain of the first monopole antenna of the antenna device for vehicle according to the comparative example in the horizontal plane direction.
Figure 12:
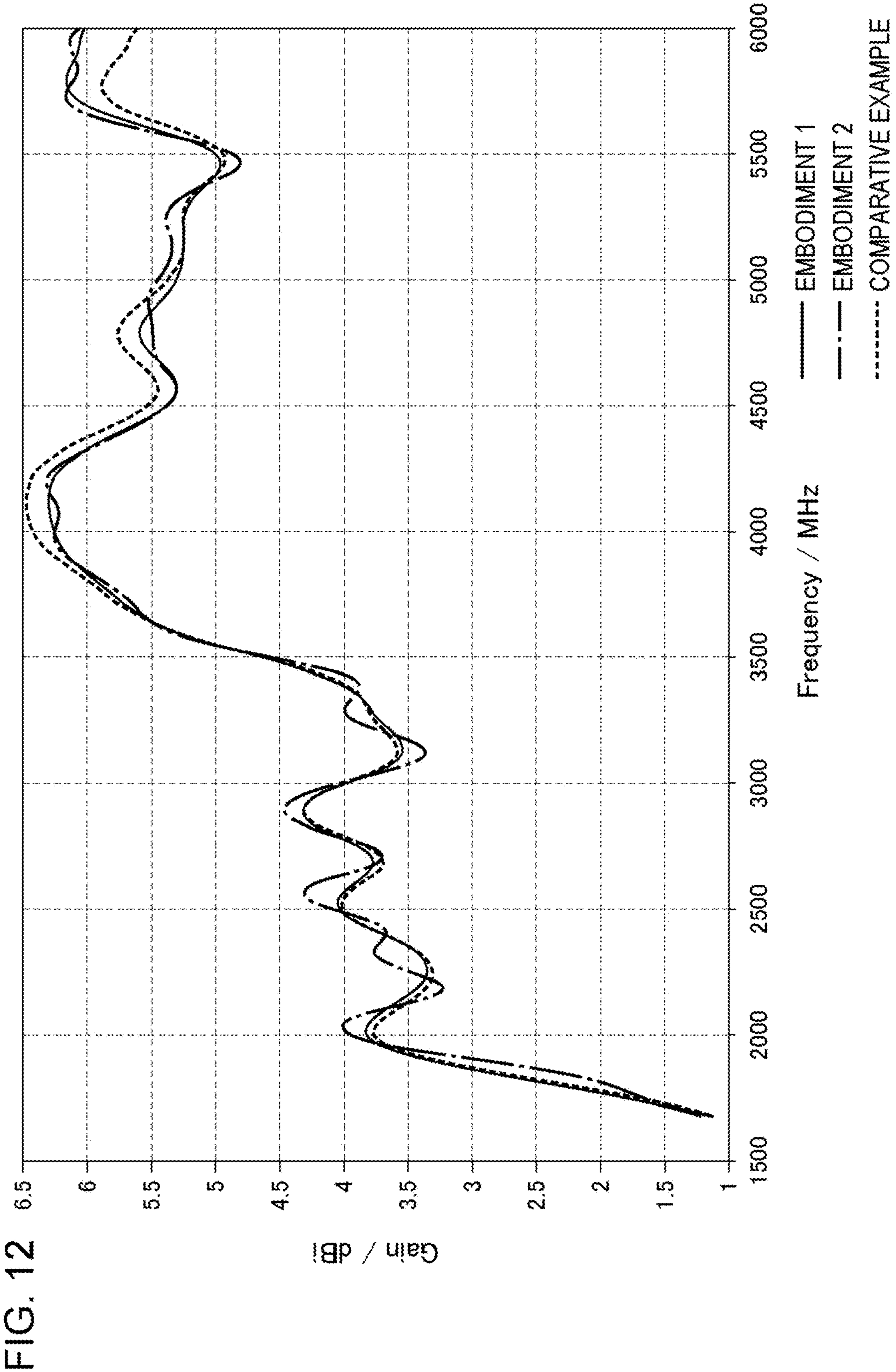
FIG. 12 is a graph showing frequency characteristics from 1.5 GHz to 6 GHz of the average gain of the second monopole antenna of the antenna device for vehicle according to Embodiment 1 in the horizontal plane direction, an average gain of the second monopole antenna of the antenna device for vehicle according to Embodiment 2 in the horizontal plane direction, and the average gain of the second monopole antenna of the antenna device for vehicle according to the comparative example in the horizontal plane direction.
Figure 13:
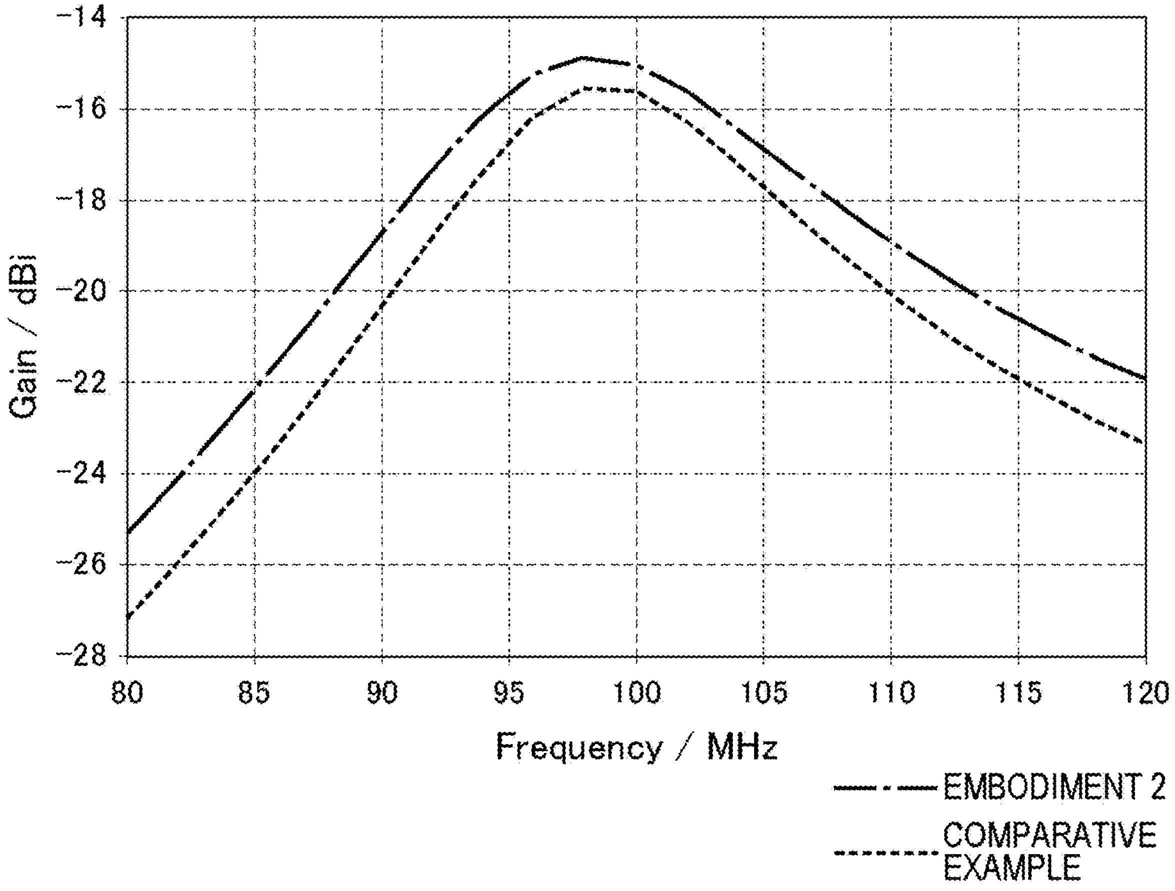
FIG. 13 is a graph showing frequency characteristics from 80 MHz to 120 MHz of an average gain of an AM/FM radio broadcast antenna of the antenna device for vehicle according to Embodiment 2 in a horizontal plane direction and an average gain of the AM/FM radio broadcast antenna of the antenna device for vehicle according to the comparative example in the horizontal plane direction.

FIG. 11 is a graph showing frequency characteristics from 1.5 GHz to 6 GHz of the average gain of the first monopole antenna 210 of the antenna device 10A for vehicle according to Embodiment 1 in the horizontal plane direction, an average gain of the first monopole antenna 210 of the antenna device 10B for vehicle according to Embodiment 2 in the horizontal plane direction, and the average gain of the first monopole antenna 210 of the antenna device 10K for vehicle according to the comparative example in the horizontal plane direction. FIG. 12 is a graph showing frequency characteristics from 1.5 GHz to 6 GHz of the average gain of the second monopole antenna 220 of the antenna device 10A for vehicle according to Embodiment 1 in the horizontal plane direction, an average gain of the second monopole antenna 220 of the antenna device 10B for vehicle according to Embodiment 2 in the horizontal plane direction, and the average gain of the second monopole antenna 220 of the antenna device 10K for vehicle according to the comparative example in the horizontal plane direction. FIG. 13 is a graph showing frequency characteristics from 80 MHz to 120 MHz of an average gain of the AM/FM radio broadcast antenna 500 of the antenna device 10B for vehicle according to Embodiment 2 in a horizontal plane direction and an average gain of the AM/FM radio broadcast antenna 500 of the antenna device 10K for vehicle according to the comparative example in the horizontal plane direction.

In FIGS. 11 to 13, the antenna device 10A for vehicle according to Embodiment 1, the antenna device 10B for vehicle according to Embodiment 2, and the antenna device 10K for vehicle according to the comparative example are disposed on an infinitely wide ground plate.

In FIGS. 11 to 13, a horizontal axis of the graph indicates a frequency (unit: MHz). A vertical axis of the graph indicates an average gain (unit: dBi) in the horizontal plane direction.

As shown in FIG. 11, over the entire frequency band of 5.5 GHz to 6.0 GHz, the average gain of the first monopole antennas 210 according to Embodiments 1 and 2 in the horizontal plane direction is higher than the average gain of the first monopole antenna according to the comparative example in the horizontal plane direction. In the frequency band of 5.5 GHz to 6.0 GHz, the average gain of the first monopole antennas 210 according to Embodiment 2 in the horizontal plane direction is approximate to the average gain of the first monopole antenna 210 according to Embodiment 1 in the horizontal plane direction.

As shown in FIG. 12, over the substantially entire frequency band of 5.5 GHz to 6.0 GHz, the average gain of the second monopole antennas 220 according to Embodiments 1 and 2 in the horizontal plane direction is higher than the average gain of the second monopole antenna 220 according to the comparative example in the horizontal plane direction. In the frequency band of 5.5 GHz to 6.0 GHz, the average gain of the second monopole antennas 220 according to Embodiment 2 in the horizontal plane direction is approximate to the average gain of the second monopole antenna 220 according to Embodiment 1 in the horizontal plane direction.

As shown in FIG. 13, over the entire frequency band of 80 MHz to 120 MHz, the average gain of the AM/FM radio broadcast antenna 500 according to Embodiment 2 in the horizontal plane direction is higher than the average gain of the AM/FM radio broadcast antenna 500 according to the comparative example in the horizontal plane direction.

From the result shown in FIG. 13, the frequency of 80 MHz to 120 MHz, that is, the gain in the FM band could be improved by electrically connecting the first parasitic element 300 and the capacitively-loaded element 520 to each other through the first filter 542, the second filter 544, the third filter 546, and the fourth filter 548. From the result shown in FIGS. 11 and 12, even if the first parasitic element 300 and the capacitively-loaded element 520 are electrically connected through the first filter 542, the second filter 544, the third filter 546, and the fourth filter 548, the gain at 5.5 GHz to 6.0 GHz could decrease little as compared with a case where the first parasitic element 300 and the capacitively-loaded element 520 are not electrically connected to each other.

Figure 14:
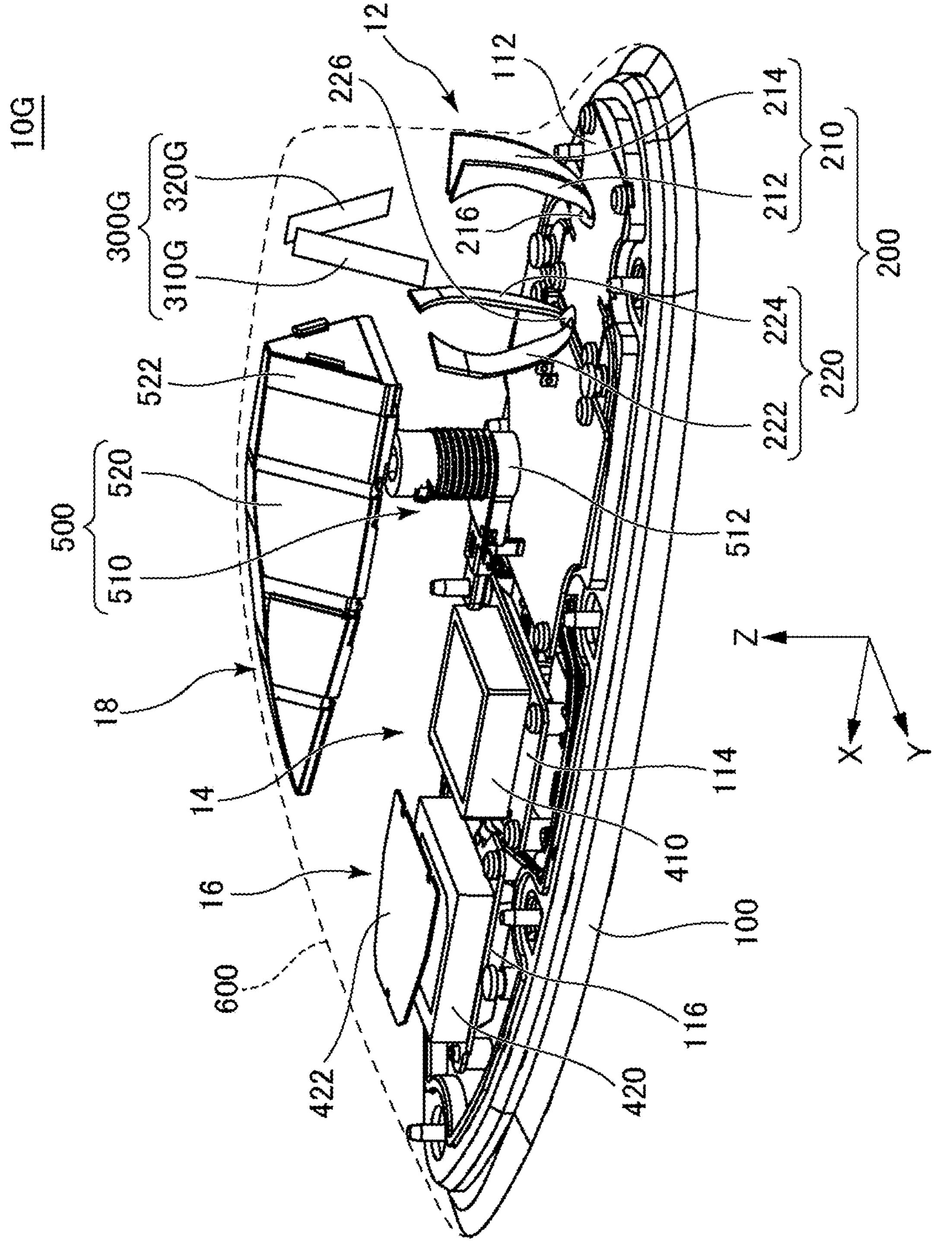
FIG. 14 is a perspective view of an antenna device for vehicle according to a modification example.

FIG. 14 is a perspective view of an antenna device 10G for vehicle according to a modification example. The antenna device 10G for vehicle according to the modification example is the same as the antenna device 10A for vehicle according to Embodiment 1, except for the following points.

The antenna device 10G for vehicle includes a first parasitic element 300G. The first parasitic element 300G has a first element part 310G and a second element part 320G. Unlike the first parasitic element 300 according to Embodiment 1, each of the first element part 310G and the second element part 320G according to the modification example has a quadrilateral shape having a length in the front-rear direction of the antenna device 10G for vehicle shorter than a length thereof in the up-down direction of the antenna device 10G for vehicle. Even in the present modification example, similarly to Embodiment 1, the gain of the high-frequency band in the horizontal plane direction can be secured while reducing the size of the antenna device 10G for vehicle, as compared with a case where the first parasitic element 300G is not provided.

Although the embodiments and modification example of the present invention have been described with reference to drawings, these are mere examples of the present invention, and various other configurations other than those given above may be adopted.

For example, conditions such as the shape and arrangement of the first parasitic element 300 are not limited to the conditions according to the embodiments and the modification example. The gain of a specific frequency band, such as a relatively high-frequency band, in a desired direction can be improved by adjusting the conditions such as the shape and arrangement of the first parasitic element 300.

According to the present specification, the following aspects are provided.

(Aspect 1)

Aspect 1 is an antenna device for vehicle including:

an antenna base;

an antenna case forming an accommodation space together with the antenna base;

a monopole antenna accommodated in the accommodation space; and a parasitic element provided above the monopole antenna.

According to Aspect 1, a gain of a high-frequency band in a desired direction can be secured while reducing the size of the antenna as compared with a case where the parasitic element is not provided.

(Aspect 2)

Aspect 2 is the antenna device for vehicle according to Aspect 1, in which the parasitic element functions as a secondary radiating element.

According to Aspect 2, the parasitic element can function as an element to increase the gain of the monopole antenna in a desired direction at a predetermined frequency.

(Aspect 3)

Aspect 3 is the antenna device for vehicle according to Aspect 1 or 2, in which the monopole antenna is a telematics antenna.

According to Aspect 3, for the telematics antenna, the gain of the high-frequency band in the horizontal plane direction can be secured while reducing the size of the antenna as in Aspect 1.

(Aspect 4)

Aspect 4 is the antenna device for vehicle according to any one of Aspects 1 to 3, including a plurality of monopole antennas.

According to Aspect 4, the plurality of monopole antennas can be operated over a wide band as compared with a case where the antenna device for vehicle includes only a single monopole antenna.

(Aspect 5)

Aspect 5 is the antenna device for vehicle according to any one of Aspects 1 to 4, in which the parasitic element is constituted by a plurality of element parts spaced apart from each other.

According to Aspect 5, the gain can be largely increased by the parasitic element by placing the plurality of element parts at an appropriate position, as compared with a case where the parasitic element is composed of a single element part. The gain of the high-frequency band in a desired direction can be also secured.

(Aspect 6)

Aspect 6 is the antenna device for vehicle according to any one of Aspects 1 to 5, in which the parasitic element functions as a part of a radio broadcast antenna.

According to Aspect 6, the size (area) of the capacitively-loaded element of the radio broadcast antenna can be increased, and a performance of the radio broadcast antenna can be improved as compared with a case where the parasitic element does not function as a part of the radio broadcast antenna.

(Aspect 7)

Aspect 7 is the antenna device for vehicle according to any one of Aspects 1 to 6, in which a distance between an end portion of the parasitic element on a side of the monopole antenna and an end portion of the monopole antenna on a side of the parasitic element is $\lambda/2 - \lambda/4$ or more and $\lambda/2+\lambda/4$ or less, where A is a wavelength of a frequency of operating frequencies of the monopole antenna at which a gain is enhanced by the parasitic element.

According to Aspect 7, the gain in the horizontal plane direction of the monopole antenna can be more enhanced by the parasitic element when the distance between the end portion of the parasitic element on the side of the monopole antenna and the end portion of the monopole antenna on the side of the parasitic element is approximately $\lambda/2$ as compared when the distance is relatively largely different from approximately $\lambda/2$.

REFERENCE SIGNS LIST

10A antenna device for vehicle
10B antenna device for vehicle
10G antenna device for vehicle
10K antenna device for vehicle
12 first antenna portion
14 second antenna portion
16 third antenna portion
18 fourth antenna portion
100 antenna base
112 first substrate
114 second substrate
116 third substrate
200 antenna element
210 first monopole antenna
212 first section
214 second section
216 first port
220 second monopole antenna
222 third section
224 fourth section
226 second port
300 first parasitic element
300G first parasitic element
310 first element part
310G first element part
320 second element part
320G second element part
410 first satellite antenna
420 second satellite antenna
422 second parasitic element
500 AM/FM radio broadcast antenna
510 helical element
512 first holder
520 capacitively-loaded element
522 second holder
532 first connection conductor
534 second connection conductor
542 first filter
544 second filter
546 third filter
548 fourth filter
600 antenna case
X first direction
Y second direction
Z third direction

The invention claimed is:

1. An antenna device for a vehicle, the antenna device comprising:

an antenna base;

an antenna case forming an accommodation space together with the antenna base;

a monopole antenna accommodated in the accommodation space; and a parasitic element provided above the monopole antenna, wherein the monopole antenna has a self-similar shape, and wherein the monopole antenna is one of a plurality of the monopole antennas.

2. The antenna device according to claim 1, wherein the parasitic element functions as a secondary radiating element.

3. The antenna device according to claim 1, wherein the monopole antenna is a telematics antenna.

4. The antenna device according to claim 1, wherein the parasitic element is constituted by a plurality of element parts spaced apart from each other.

5. The antenna device according to claim 1, wherein the parasitic element functions as a part of a radio broadcast antenna.

6. The antenna device according to claim 1, wherein a distance between an end portion of the parasitic element on a side of the monopole antenna and an end portion of the monopole antenna on a side of the parasitic element is $\lambda/2-\lambda/4$ or more and $\lambda/2+\lambda/4$ or less, where $\lambda$ is a wavelength of a frequency of operating frequencies of the monopole antenna at which a gain is enhanced by the parasitic element.

7. The antenna device according to claim 1, wherein the monopole antenna has a U-shape.

8. The antenna device according to claim 1, further comprising an antenna including a capacitively-loaded element.

9. The antenna device according to claim 8, wherein the parasitic element functions as a part of the antenna.

10. The antenna device according to claim 9, wherein the parasitic element and the capacitively-loaded element are electrically connected through a filter.

11. The antenna device according to claim 1, wherein the plurality of the monopole antennas includes a first monopole antenna and a second monopole antenna disposed in a front-rear direction.

12. The antenna device according to claim 11, wherein a first part of the parasitic element is provided above the first monopole antenna and a second part of the parasitic element is provided above the second monopole antenna.

13. An antenna device for a vehicle, the antenna device comprising:

an antenna base;

an antenna case forming an accommodation space together with the antenna base;

a monopole antenna accommodated in the accommodation space; and a parasitic element provided above the monopole antenna, wherein the monopole antenna has a self-similar shape, and wherein the parasitic element is constituted by a plurality of element parts spaced apart from each other.

14. The antenna device according to claim 13, wherein the parasitic element functions as a secondary radiating element.

15. The antenna device according to claim 13, wherein a distance between an end portion of the parasitic element on a side of the monopole antenna and an end portion of the monopole antenna on a side of the parasitic element is $\lambda/2-\lambda/4$ or more and $\lambda/2+\lambda/4$ or less, where $\lambda$ is a wavelength of a frequency of operating frequencies of the monopole antenna at which a gain is enhanced by the parasitic element.

16. The antenna device according to claim 13, wherein the monopole antenna has a U-shape.

17. The antenna device according to claim 13, further comprising an antenna including a capacitively-loaded element.

18. An antenna device for a vehicle, the antenna device comprising:

an antenna base;

an antenna case forming an accommodation space together with the antenna base;

a monopole antenna accommodated in the accommodation space; and a parasitic element provided above the monopole antenna, wherein the monopole antenna has a self-similar shape, and wherein the monopole antenna has a U-shape.

19. The antenna device according to claim 18, wherein the parasitic element functions as a secondary radiating element.

20. The antenna device according to claim 18, wherein a distance between an end portion of the parasitic element on a side of the monopole antenna and an end portion of the monopole antenna on a side of the parasitic element is $\lambda/2-\lambda/4$ or more and $\lambda/2+\lambda/4$ or less, where $\lambda$ is a wavelength of a frequency of operating frequencies of the monopole antenna at which a gain is enhanced by the parasitic element.

* * * * *